United States Patent [19]

Vossieck et al.

[11] 4,084,826

[45] Apr. 18, 1978

[54] SHAFT SEAL RING

[75] Inventors: Paul Vossieck; Hans Deuring, both of Burscheid, Germany

[73] Assignee: GOETZEWERKE Friedrich Goetze AG, Burscheid, Germany

[21] Appl. No.: 751,894

[22] Filed: Dec. 17, 1976

[30] Foreign Application Priority Data

Dec. 18, 1975 Germany .............................. 2556992

[51] Int. Cl.$^2$ ................................................ B61F 15/22
[52] U.S. Cl. ............................................................ 277/134
[58] Field of Search .............................................. 277/134

[56] References Cited

U.S. PATENT DOCUMENTS

| 3,620,540 | 11/1971 | Jagger | 277/134 |
| 3,801,113 | 4/1974 | Jackson | 277/134 |
| 3,973,781 | 8/1976 | Grarich | 277/134 |

FOREIGN PATENT DOCUMENTS

| 2,021,382 | 11/1970 | Germany | 277/134 |
| 499,480 | 1/1939 | United Kingdom | 277/134 |
| 1,382,281 | 1/1975 | United Kingdom | 277/134 |

*Primary Examiner*—Herbert F. Ross
*Attorney, Agent, or Firm*—Spencer & Kaye

[57] ABSTRACT

A shaft seal ring has a resilient sealing lip provided with a contact face oriented at an inclined angle with respect to the seal ring axis. The contact face includes a sealing edge for circumferentially engaging the surface of a shaft on which the shaft seal ring is mounted. The contact face has a plurality of circumferentially disposed ribs oriented at alternatingly opposite inclination with respect to the sealing edge. Any adjoining, oppositely inclined two ribs meeting in a point of intersection on the sealing edge form first rib pairs. A second rib pair is provided in the area bounded by the one and the other rib of each first rib pair; the one and the other rib forming each second rib pair terminates on, and is oppositely inclined with respect to, the one and the other rib of the associated first rib pair.

7 Claims, 6 Drawing Figures

SHAFT SEAL RING

BACKGROUND OF THE INVENTION

This invention relates to a shaft seal ring which has a sealing lip made of an elastic material. The air-side contacting surface of the sealing lip which is arranged at an inclination to the seal ring axis and thus to the shaft surface has a plurality of circumferentially distributed rib pairs. The individual ribs extend at an alternately opposite inclination to the circumferential direction and meet in the sealing edge.

Shaft seal rings having rib-like raised portions which are disposed at an inclination to the sealing edge and which serve for returning leakage liquid to the liquid side of the seal are generally known and are disclosed, for example, in French Pat. No. 1,227,078 to which corresponds British Pat. No. 888,198. By virtue of arranging the ribs — which extend up to the sealing edge — in a groupwise or individually alternating inclination with respect to the circumferential direction, there is sought to provide a return effect — which is independent from the direction of shaft rotation — for the leakage liquid that has escaped underneath the sealing edge. Further, in the German Laid-Open Application (Offenlegungsschrift) No. 2,021,382 there are disclosed ribs which are arranged in an alternately opposite inclination with respect to the circumferential direction which criss-cross one another and which extend from the sealing edge up to an axially spaced bounding edge of the air-side contact face. Between the ribs rhomboidal contact face zones are defined. Due to the relatively small angle of inclination (less than 20°) between each individual rib, on the one hand, and the sealing edge, on the other hand, there is formed in the circumferential direction, a relatively wide contact face with the shaft surface at the location of the sealing edge where two ribs meet. In service, the magnitude of this contact face further increases due to wear and thus the risk of leakage in this zone from the liquid side towards the air of the shaft seal will be particularly significant. Ribs having relatively small angles of inclination with respect to the sealing edge are, furthermore, excessively long and thus it is not feasible to provide, with sufficient accuracy, the curved contact faces of the seal making dies with grooves that correspond to the shaft seal ribs. For this reason the ribs are arranged at a greater angle of inclination with respect to the sealing edge and, as a result, they can be relatively short, as may be seen in British Pat. No. 1,239,873.

SUMMARY OF THE INVENTION

It is an object of the invention to provide an improved shaft seal ring of the type disclosed in British Pat. No. 1,239,873 (and wherein the pair-wise arranged return ribs extending in opposite directions of inclination meet in the sealing edge) for preventing leakage liquid from escaping in the zone of the meeting points of the rib pairs, due to wear of the sealing edge.

This object and others to become apparent as the specification progresses, are accomplished by the invention, according to which, briefly stated, a second rib pair is provided in the area bounded by the one and the other rib of each earlier-mentioned (first) rib pair; the one and the other rib forming each second rib pair terminates on, and is oppositely inclined with respect to, the one and the other rib of the associated first rib pair.

The arrangement of a second rib pair axially behind the first rib pair with an oppositely oriented inclination of the individual ribs has the advantage that the leakage fluid which passes in particular at the meeting points of ribs of the first rib pair is, by the ribs of the second rib pair, captured and returned to the running zone of the sealing edge; at the same time, the returning liquid lubricates the sealing edge. By virtue of the fact that the ribs of the second rib pair do not intersect the ribs of the first rib pair and do not extend up to the sealing edge, there is provided, in a circumferential zone and in a manner axially spaced from the sealing lip, twice the number of peaks of further rib pairs directed towards the sealing edge. This arrangement, particularly after a more substantial wear of the sealing edge has taken place, contributes to an intensified liquid return effect.

The locations of contact of the first rib pair with the second rib pair preferably lie in a radial plane that is parallel to the sealing edge, so that in case of the same, but oppositely oriented rib inclination with respect to the circumferential direction, there is achieved a uniform liquid return effect independently of the direction of shaft rotation. The plane containing these locations of contact should lie within the axial width of the relatively wide running zone of the sealing lip set during operation due to the wear of the sealing edge, in order to insure an optimum effect of the ribs of the second rib pair, particularly during later service periods. The axial distance of the locations of contact of the rib pairs from the sealing edge preferably should not exceed a maximum value of 1 mm.

In order to practice the invention, it is not critical that the ribs of the second rib pair meet in a point of intersection. According to a further feature of the invention, however, it may be of advantage, particularly regarding the disclosure of the German Laid-Open Application No. 2,021,382, if the ribs of the second rib pair intersect so that there is obtained, in the circumferential direction, an uninterrupted, zig-zag extending liquid lock which functions as a liquid (oil) retaining rib.

It is, in essence, feasible within the scope of the invention to form the rib pairs with non-uniform radial rib height. Particularly, the radial height of the ribs may increase as their distance from the sealing edge increases, so that in case of wear of the sealing edge and the inherent greater leakage of liquid, there is obtained a radial rib height which is adapted to the liquid quantities to be returned.

DESCRIPTION OF THE PREFERRED EMBODIMENTS

Figure 1:
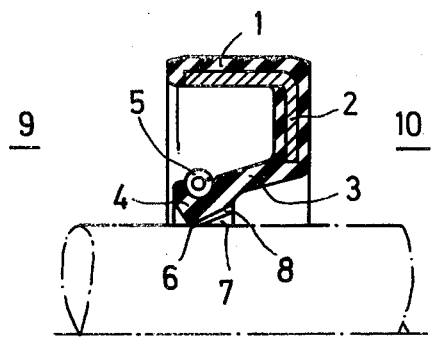
FIG. 1 is an axial sectional view of a preferred embodiment of the invention.

Turning now to FIG. 1, the shaft seal ring shown therein comprises an angularly bent rubber housing 1 having an embedded (vulcanized) reinforcing sleeve 2, to the radially inner circumference of which there is vulcanized an elastic diaphragm 3 terminating in an elastic sealing lip 4. For increasing the radial force exerted by the sealing lip 4, there is provided a circumferential coil spring ring 5. The sealing lip 4 of the shaft seal ring engages the surface of the shaft (shown in dash-dot lines) with the sealing edge 6 as well as with the contact face 7 which is adjacent the sealing edge and which is inclined to the shaft seal ring axis and thus to the surface of the shaft to be sealed. The contact face 7 has rib-like elevations 8 which serve for returning leakage liquid that has escaped under the sealing edge 6 from the liquid side 9 towards the air side 10 of the shaft seal ring.

Figure 2:
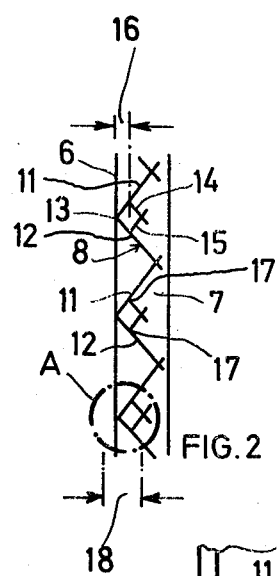
FIGS. 2 and 3 are fragmentary schematic developments of two different rib patterns structured according to the invention.
Figure 3:
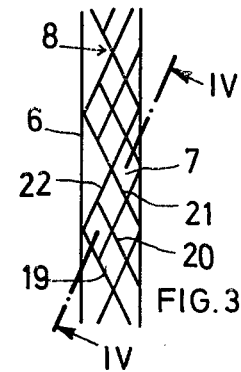

The contact face patterns shown developed in FIGS. 2 and 3 illustrate two different embodiments of the rib-like elevations 8. According to FIG. 2, there is provided a plurality of first rib pairs 11, 12 distributed in the circumferential direction. The individual ribs extend in an alternating opposite inclination to the sealing edge and meet in location 13 lying on the sealing edge 6. A second rib pair, formed of individual ribs 14 and 15, extends with a reverse direction of inclination with respect to ribs 11, 12. The ribs 14, 15 of each second rib pair are disposed within the area bounded by the ribs 11, 12 of the associated first rib pair and terminate in a location of contact 17 on the ribs 11, 12 of the associated first rib pair. Thus, the rib 14 and the rib 15 have no continuation on the other side of the respective rib 11 or 12. Stating this lack of continuation differently, the area bounded by the sealing edge 6 and located externally of the areas bounded by each rib pair formed of ribs 11 and 12 is rib-free. Each second rib pair 14, 15 extends at such an axial distance from the first rib pair 11, 12 that in case there occurs a more substantial leakage because of wear, particularly in the zone of the locations 13, there is insured a more effective return of the leakage liquid. The increase of the return effect is achieved by providing twice as many locations of contact 17 as there are locations of contact 13. Consequently, it is of significance that the contact locations 17 are disposed within the maximum axial width 18 of the circumferential portion of the contact face 7 which is designed to constitute a shaft-engaging running zone subsequent to wear in service.

Figure 4:
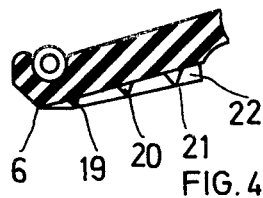
FIG. 4 is a fragmentary cross-sectional view of an embodiment patterned according to FIG. 3 and taken along line IV—IV of FIG. 3.

In FIG. 3 there is shown another variant of the rib pair arrangement. FIG. 4 cross-sectionally illustrates a shaft seal ring designed according to FIG. 3. Particularly the increase of the radially measured height of the ribs 19, 20, 21 and 22 as a function of their distance from the sealing lip 6 is well visible.

Figure 5:
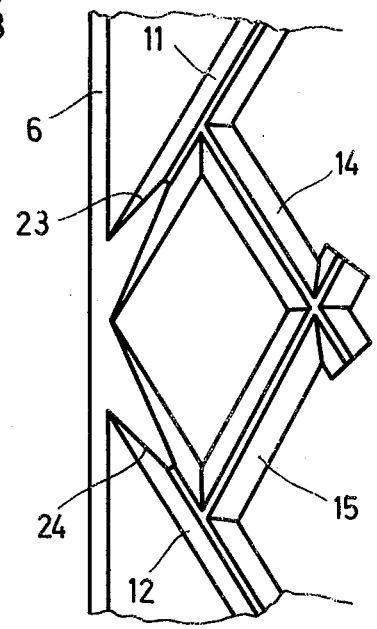
FIGS. 5 and 6 are fragmentary plan views, on an enlarged scale of the detail A of FIG. 2 before and after substantial wear.
Figure 6:
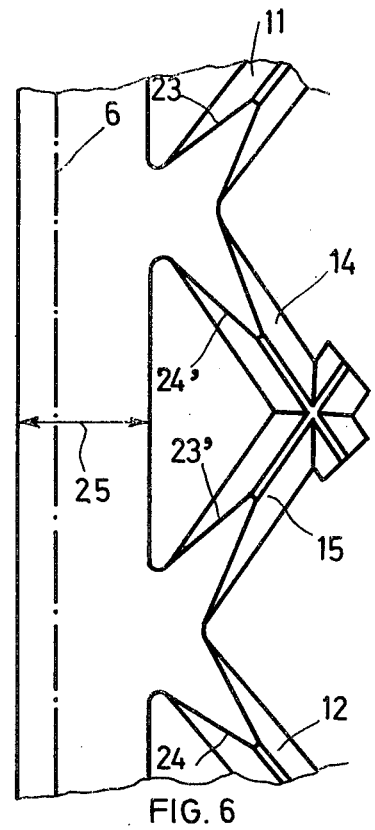

FIG. 5 shows, on a substantially enlarged scale, the detail A of FIG. 2 in a slightly worn condition, whereas FIG. 6 shows the same detail in a substantially more worn state. Thus, in FIGS. 5 and 6 the difference in the contact faces of the originally narrow sealing edge 6 as well as ribs 11 and 12 with the shaft surface in the new condition (FIG. 5) and after a longer operational period (FIG. 6) is illustrated. These Figures clearly demonstrate the advantage of the invention: After a relatively substantial wear of the sealing lip in the zone of the sealing edge 6, the number of the edges 23 and 24 which are at an inclination to the sealing axis and which effect a return of the leakage liquid is doubled due to the inclusion of the edges 23' and 24' by virtue of the presence of the second rib pair 14, 15. Thus, the greater leakage quantities that escape because of the smaller surface pressure is now, independently from the direction of shaft rotation, returned into the range of the running zone 25 of the sealing edge 6 by twice the number of leakage return edges.

It will be understood that the above description of the present invention is susceptible to various modifications, changes and adaptations, and the same are intended to be comprehended within the meaning and range of equivalents of the appended claims.

What is claimed is:

1. In a shaft seal ring having a resilient sealing lip provided with a contact face oriented at an inclined angle with respect to the seal ring axis; the contact face including a sealing edge for circumferentially engaging the surface of a shaft on which the shaft seal ring is mounted; the sealing edge determining a liquid side and an air side for the shaft seal ring; the contact face being provided with a plurality of circumferentially disposed ribs oriented at alternatingly opposite inclination with respect to the sealing edge; any adjoining, oppositely inclined two ribs constituting first and second ribs that meet at a point of intersection on the sealing edge and form first rib pairs; said first rib pairs being disposed at the air side; the improvement comprising a second rib pair provided in the area bounded by each said first rib pair; each second rib pair being formed by a third rib and fourth rib terminating on the first and second rib, respectively, of the associated first rib pair at a distance from their said point of intersection; said third rib having a reverse direction of inclination with respect to the first rib on which it terminates and said fourth rib having a reverse direction of inclination with respect to the second rib on which it terminates; the area bounded by said sealing edge and located externally of the areas bounded by each said first rib pair being rib-free and thereby reduce the total contact area of the ribs of said seal in the area bounded by the sealing edge.

2. A shaft seal ring as defined in claim 1, wherein the locations of contact of the ribs of said first rib pairs with the ribs of said second rib pairs are disposed in a radial plane extending parallel to said sealing edge.

3. A shaft seal ring as defined in claim 1, wherein the locations of contact of the ribs of said first rib pairs with the ribs of said second rib pairs are situated within the axial width of that circumferential portion of said contact face which is designed to constitute a shaft-engaging running zone of the sealing lip subsequent to wear in service.

4. A shaft seal ring as defined in claim 1, wherein the locations of contact of the ribs of said first rib pairs with the ribs of said second rib pairs have an axial distance of maximum 1 mm from said sealing edge.

5. A shaft seal ring as defined in claim 1, wherein the ribs forming each said second rib pair intersect.

6. A shaft seal ring as defined in claim 1, wherein the radially measured height of the ribs forming said first rib pairs and said second rib pairs have different magnitudes.

7. A shaft seal ring as defined in claim 1, wherein the radially measured height of each rib forming said first and second rib pairs increases with increasing distance from said sealing edge.

* * * * *